United States Patent
Drake et al.

[11] 4,042,402
[45] Aug. 16, 1977

[54] BIOCIDAL GLASS MATERIALS

[75] Inventors: Cyril Francis Drake, Harlow; Robert Walter James Amos, New Barnet, both of England

[73] Assignee: International Standard Electric Corporation, New York, N.Y.

[21] Appl. No.: 645,484

[22] Filed: Dec. 31, 1975

[30] Foreign Application Priority Data
  Jan. 7, 1975  United Kingdom .................. 600/75

[51] Int. Cl.$^2$ .......................... C09D 5/14; C03C 3/14; C03C 3/30
[52] U.S. Cl. .............................. 106/15 R; 106/47 R; 106/50; 106/54
[58] Field of Search .................. 106/47, 50, 54, 15 A, 106/15 F

[56]  References Cited
  U.S. PATENT DOCUMENTS

| | | | |
|---|---|---|---|
| 2,486,812 | 11/1949 | Weyl | 106/47 |
| 2,579,610 | 12/1951 | Pitre et al. | 106/15 AF |
| 2,605,205 | 7/1952 | Patterson | 106/50 UX |
| 3,084,055 | 4/1963 | Carpenter et al. | 106/47 |
| 3,341,453 | 9/1967 | Ralston | 106/47 X |
| 3,385,915 | 5/1968 | Hamling | 106/50 |
| 3,440,588 | 4/1969 | Drake et al. | 357/2 |
| 3,445,254 | 5/1969 | Tiede | 106/50 |
| 3,476,577 | 11/1969 | Davie | 106/54 X |
| 3,639,113 | 2/1972 | Aslanova et al. | 106/50 |
| 3,792,000 | 2/1974 | Conger et al. | 106/15 AF |
| 3,883,358 | 5/1975 | Malmendier | 106/47 R |

OTHER PUBLICATIONS

Kreidl, N. J. et al., "Phosphates in Ceramic Ware:IV, Phosphate Glasses" J. Am. Cer. Soc. 1941, 24 (11), pp. 372-378.
Rawson, H. *Inorganic Glass-Forming Systems* (1967), Acedemic Press, N.Y, pp. 97-98, 160-161, 172-173.

*Primary Examiner*—Winston A. Douglas
*Assistant Examiner*—Mark Bell
*Attorney, Agent, or Firm*—John T. O'Halloran; Peter C. Van Der Sluys; Richard A. Menelly

[57]  ABSTRACT

Biocidal glass materials are prepared from a mixture of boric oxide, aluminum oxide and cupric oxide in powdered form. After fusing the powder into glass, the glass is ground and deposited in a marine paint composition to provide a paint decomposition rate of 20 micrograms per hour in seawater.

1 Claim, No Drawings

BIOCIDAL GLASS MATERIALS

This invention relates to vitreous materials containing one or more water soluble materials, which materials are slowly leached from the vitreous material on contact with water or an aqueous solution.

The growth of aquatic or marine organisms on exposed surfaces, for example storage tanks, submarine telephone cables, submarine telephone repeaters, ships' hulls and oil rigs, can be a serious and expensive problem. Thus the growth of algae and barnacles on the hull of an ocean-going vessel can seriously impede the streamline motion of the vessel through the water leading to increased propulsion costs and wastage of energy or to lower steaming speeds. Periodic cleaning of the hull is also expensive as the vessel must be removed from service and dry dock facilities are normally required for the process.

The object of the invention is to minimise or to overcome this disadvantage.

According to the invention there is provided a material for the controlled release of liquid-soluble metal ions or metal-complex ions into solution in a liquid including a vitreous matrix containing in oxide form the metal or metals to be released, a glass forming oxide, and one or more oxides which control the rate of release of the metal or metals into solution.

According to the invention there is further provided an antifouling paint for marine and/or aquatic use, including a powdered vitreous material dispersed in a resin vehicle, in which the vitreous material includes a glass forming oxide, oxides of one or more metals toxic to marine or aquatic life, and one or more oxides for controlling the rate of release of the toxic metal or metals from the vitreous material into aqueous solution.

In a preferred embodiment the paint includes a resin vehicle, such as an acrylic or a polyurethane resin, which sets after painting on a solid surface and which contain a suspension of a finely powdered glass material. The glass contains one or more oxides of a metal or metals whose salts are toxic to such forms of marine life as those which attach themselves to solid surfaces, as for example, barnacles, sea-weeds, and green algae. Suitable metals for this purpose include copper, zinc, mercury, cadmium, tin, chromium and silver.

The metal oxide or oxides are dispersed in a vitreous matrix formed by fusing one or more glass forming oxides such as phosphorus pentoxide or boric oxide, with one or more glass modifying oxides, such as calcium oxide, magnesium oxide, alumina or sodium monoxide which affect the rate at which the glass is dissolved and the toxic metal is leached into aqueous solution. Thus the addition of sodium monoxide into the glass increases the rate at which the toxic metal is released whilst the addition of alumina or calcium oxide to the glass decreases the release rate. In this way the rate of release of the matrix material from the paint can be adjusted according to the particular application and operating environment required. Normally the rate of release of the active material is adjusted to the minimum necessary to prevent the growth of marine or aquatic life, e.g. to prevent the growth of barnacles or sea-weed on the hull of a ship. The amount of material thus released is then sufficiently small that only a minimum ecologically safe pollution of the surrounding aqueous environment occurs except for the very small region in contact with the paint where biocidal metal concentrations are produced. Moreover the working life of the antifouling coating will be maximised.

In some applications the paint may also include polymers, such as polyoxymethylene, which, when released into the water, reduce the friction between the water and the hull of a ship. In other applications such a paint may be used for coating the inside of a pipeline to prevent bacterial or fungal growth, or for coating water tanks and swimming pools to prevent the growth of green algae.

In a further application the glass may be dispersed in a transparent resin for painting on glass, for example greenhouse windows, to prevent the growth of light absorbing organisms. In such an application a resin having a refractive index similar to that of the biocidal glass should be employed. The use of a vitreous material as the carrier of the toxic material makes it possible by the choice of the glass composition to select a release rate from a wide and continuous range of possible release rates in contrast to the antifouling paints previously used containing the toxic ion in the form of a stoichiometric compound when clearly it is only possible to select from a small number of release rates where that number is equal to the number of available compounds. In further applications the paint may be arranged to release two or more metals into solution the two or more metals being chosen so as to have a synergistic poisoning effect on marine or aquatic life.

In some applications some or all of the glass particles may be provided with an outer shell of a glass or other material which is less soluble in water than the central core of the particle. In this way the paint composition may be adjusted to provide a steady rate of toxic metal release over a long period after an initial induction period with a small or zero rate of release, the encapsulation thickness and solubility being adjusted to produce the desired delayed release effect.

In further application the resin vehicle may be dispensed with and the vitreous material applied directly to a metal or other refractory solid surface either by dip coating in the molten glass or by fluidised bed coating with the powdered material followed by heating to produce a fused coating. In other applications the vitreous material may be applied by a vapour phase or a glow discharge process.

In a further embodiment the biocidal glass may be drawn into fibres which can then be pressed or woven into a mat or fabric. The mat can then be applied with or without the addition of a resin to the surface to be protected.

The following examples illustrate the invention.

EXAMPLE 1

A glass was prepared by mixing, in dry powder form, 79g boric oxide ($B_2O_3$), 14g aluminium oxide ($Al_2O_3$) and 122 gms cupric oxide (CuO) and fusing the mix at 1250° C for 10 minutes in a gas-air furnace. The glass was thoroughly mixed by shaking during the fusion process and was then flash cooled by pouring on to a cold metal sheet. The final molar composition of the glass, after loss of boric oxide by evaporation was found to be 57.7 moles cupric oxide, 37.0 moles boric oxide and 5.3 moles aluminium oxide.

The glass was ground to a fine powder and dispersed in a standard marine paint composition to form an antifouling paint. The dissolution rate of the paint composition in sea water was found to be 20 micrograms (0.02 mg.)/hour/$cm^2$.

EXAMPLE 2

Glasses were prepared and incorporated in a paint composition as described in Example 1. The sea water dissolution rates of the resulting paint compositions were measured and are expressed in the following table.

Table 1

| Glass Molar Composition | | | | Dissolution Rate |
| --- | --- | --- | --- | --- |
| CuO | $B_2O_3$ | $Al_2O_3$ | $SiO_2$ | |
| 47.3 | 47.6 | 5.1 | — | 0.06 Mg/hr/cm$^2$ |
| 47.4 | 47.5 | — | 5.1 | 1.2 Mg/hr/cm$^2$ |

This example demonstrates the dissolution inhibiting effect of aluminium oxide.

It is to be understood that the foregoing description of specific examples of this invention is made by way of example only and is not to be considered as a limitation on its scope.

What is claimed is:

1. In a $CuO$—$B_2O_3$—$Al_2O_3$ glass anti-foulant of the type used for the controlled release of liquid soluble metal ions into solution in seawater, the improvement wherein: the molar ratio of CuO to $B_2O_3$ is from about 2 to 1 to about 1 to 1, the remainder is $Al_2O_3$ at about 5 mole percent to provide a dissolution rate of about 0.02 to 0.06 milligrams per hour per square centimeter of copper ions on contact with seawater.

* * * * *